Figure 3:
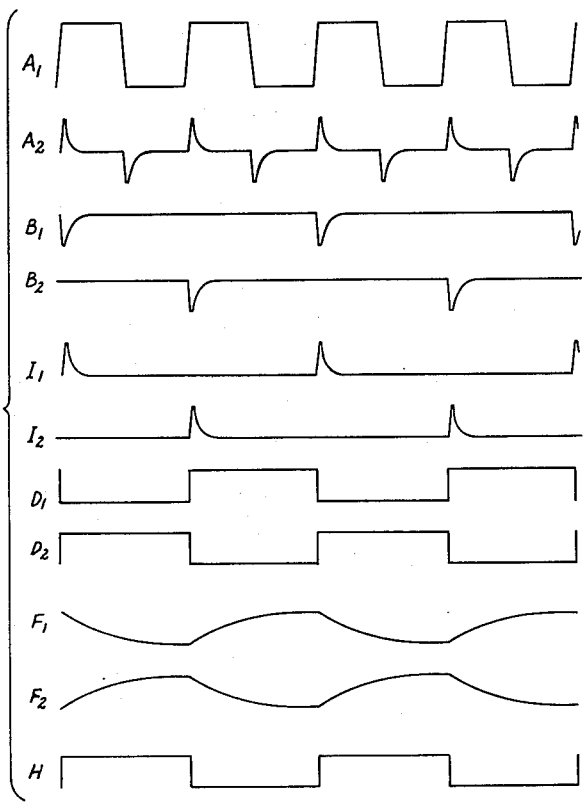

May 2, 1944.          P. C. MICHEL          2,348,016
                      COUNTER CIRCUIT
                    Filed Nov. 13, 1941          2 Sheets-Sheet 1
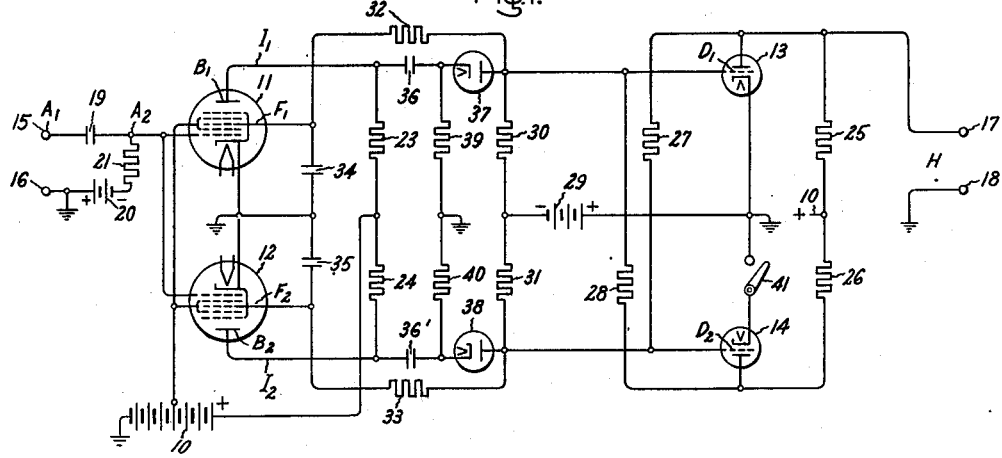
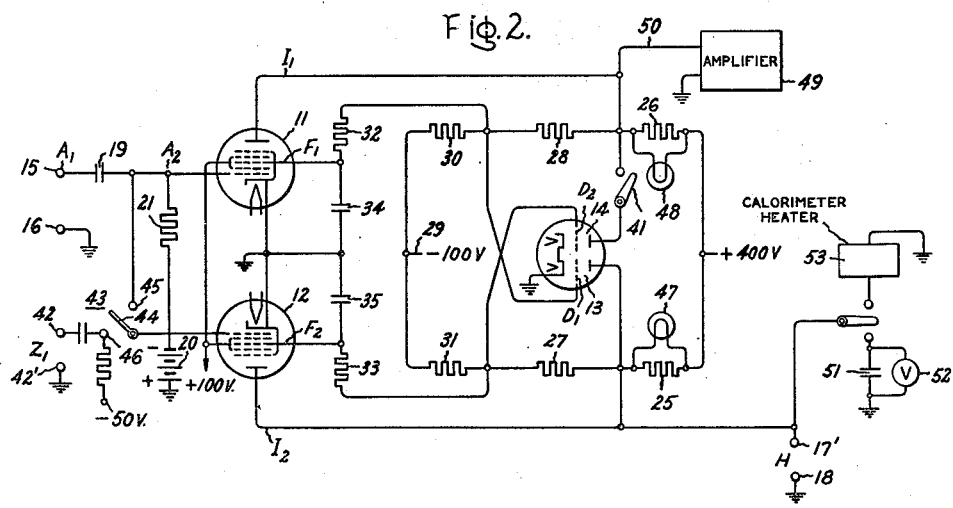
Inventor:
Philip C. Michel,
by Harry E. Dunham
His Attorney.

May 2, 1944.   P. C. MICHEL   2,348,016
COUNTER CIRCUIT
Filed Nov. 13, 1941   2 Sheets-Sheet 2

Inventor:
Philip C. Michel,
by Harry E. Dunham
His Attorney.

Patented May 2, 1944

2,348,016

UNITED STATES PATENT OFFICE 2,348,016

COUNTERCIRCUIT

Philip C. Michel, Schenectady, N. Y., assignor to General Electric Company, a corporation of New York Application November 13, 1941, Serial No. 419,034

7 Claims. (Cl. 250—27)

My invention relates to impulse responsive apparatus and concerns particularly electric discharge device circuits.

Among the objects of my invention are the provision of accurate and reliable arrangements for counting impulses at high frequency as well as at relatively lower frequencies, the provision of arrangements for frequency division and for operating indicators or relays to show whether the number of impulses or signals received has been even or odd, and the provision of arrangements for measurement of time intervals, or for rendering apparatus operative or inoperative during the time interval between two signals received over the same or different circuits.

Other and further objects and advantages will become apparent as the description proceeds.

Apparatus embodying my invention is useful for various purposes where the condition of a device is to be modified in response to successive impulses. For example, the time interval between two impulses may be measured by suitable apparatus which is started in operation by an impulsive responsive device when one impulse is received and is stopped when a second impulse is received.

In carrying out my invention in its preferred form I provide a pair of electric discharge devices connected to form a single-pole double-throw electronic switch and a second pair of electric discharge devices in a push-pull connection to form a two-equilibrium-mode circuit. This combination may serve as the "impulse-responsive device" controlling other apparatus when the invention is to be employed in connection with time interval measurement. Each of the discharge devices has control electrodes and one pair of discharge devices is coupled to the other. The two-equilibrium-mode circuit discharge devices have control electrodes and anodes cross coupled in such a manner that one or the other of the devices is biased past cutoff by the flow of anode current through the other. The first pair of electric discharge devices is provided also with auxiliary control electrodes, which are so connected to the circuits of the equilibrium mode circuit discharge devices that only one or the other of the first pair of electric discharge devices is in condition to be affected by excitation of its primary control electrode according to which of the two equilibrium mode circuit discharge devices is carrying current. Thus, the first pair of electric discharge devices acts as an electronic switch adapted to pass signals through one or the other device according to which is in condition to be effective.

For the counting of impulses on a scale of two, the primary control electrodes of both of the first pair of electric discharge devices may be coupled to a source of input signals, so that the first or the second of the discharge devices in the pairs of electric discharge devices is energized according to whether an even or an odd number of impulses has been received. Suitable indicators, relays or the like are connected in or coupled to one or the other of the discharge device circuits of the second pair for producing a response dependent upon whether the number of impulses is odd or even. For insuring the maintenance of the control electrode voltage of the two equilibrium mode circuit discharge devices at a sufficiently negative value when they have been biased beyond cutoff by sharp negative voltage impulses from the first pair of discharge devices, diode tubes or rectifiers may be interposed in the connections between the control electrode circuits of the two equilibrium mode circuit discharge devices and the output terminals of the first pair of discharge devices.

A better understanding of the invention will be afforded by the following detailed description considered in connection with the accompanying drawings, and those features of the invention which are believed to be novel and patentable will be pointed out in the claims appended hereto.

In the drawings Fig. 1 is an electrical circuit diagram of one embodiment of my invention; Fig. 2 is an electrical circuit diagram of a modification of Fig. 1, and Fig. 3 is a set of graphs illustrating the principle of operation of my apparatus and showing the wave form of voltages and currents at various points in the circuits.

Like reference characters are utilized throughout the drawings to designate like parts.

In the arrangement illustrated in Fig. 1 there is a first pair of current-controlling devices, preferably electric discharge devices 11 and 12, which I call electronic switch tubes, and a second pair of current-controlling devices, preferably electric discharge devices 13 and 14, which I call two equilibrium mode circuit tubes. The electric discharge devices are of the control electrode type each having the usual anode, cathode and control electrode. Each of the discharge devices 11 and 12, however, has also an additional or auxiliary control electrode. The discharge devices are preferably of the vacuum tube type. If desired, the discharge devices may also have additional electrodes for improved operation as will be understood by those skilled in the art.

In the specific arrangement illustrated in Fig. 1

I have shown the electric discharge device units 13 and 14 in the form of separate triodes. It will be understood that my invention is not limited thereto and includes the use of a double tube such as a double triode, for example. The discharge devices 11 and 12 are illustrated as being of the pentagrid type such as 6L7 tubes with indirectly heated cathodes. For convenience the control electrodes or grids of the tubes 11 and 12 are referred to as the #1, #2, #3, #4 and #5 grids numbering from the cathode toward the anode. The #1 grid, nearest the cathode is ordinarily the primary control electrode.

For use as a scale of two impulse counter and frequency divider the apparatus of Fig. 1 includes a pair of input terminals 15 and 16, and a pair of output terminals 17 and 18. The terminals 16 and 18 and appropriate points in the tube circuits may be grounded.

The input terminal 15 is coupled to the primary or #1 control electrodes or grids of the tubes 11 and 12 through a coupling condenser 19. A fixed bias 20 may be provided in the form of a battery grounded on the positive side and connected on the negative side through a resistor 21 to the #1 grids of the tubes 11 and 12. The cathodes as well as the #5 grids of the tubes 11 ad 12 are grounded and the anodes are connected to the positive side of a suitable source of anode potential 10 through a pair of anode resistors 23 and 24 respectively. The positive side of the anode voltage source is represented by a plus sign and the negative side is assumed to be grounded.

The triodes 13 and 14 also have their cathodes grounded and their anodes connected to the anode-voltage source 10 through anode resistors 25 and 26, respectively. The anode of the tube 13 is connected to the output terminal 17. The anodes and control electrodes or grids of the tubes 13 and 14 are cross-coupled through a pair of resistors 27 and 28. The control electrodes or grids are provided with a fixed bias 29 which may take the form of a battery grounded on the positive side and connected on the negative side through resistors 30 and 31 to the grids of the tubes 13 and 14, respectively.

The electronic switch tubes 11 and 12 each have an auxiliary control electrode or grid; in this case the #3 grids marked $F_1$ and $F_2$, respectively, which are connected through resistors 32 and 33 to the control electrodes of the tubes 13 and 14, respectively. The #3 or auxiliary grids $F_1$ and $F_2$ are grounded with respect to high frequency of sudden voltage change through condensers 34 and 35, respectively. In the arrangement shown the #2 and #4 grids of the tubes 11 and 12 serve as shield grids for the #3 grids and are connected together to a point in the voltage source 10 at a suitable potential intermediate ground potential and the maximum potential of the anode voltage source 10. The #5 or suppressor grids are connected to the cathodes. However, my invention is not limited to the precise arrangement illustrated and does not exclude the operation of the tubes 11 and 12 by the suppressor or other grids instead of by the controlled bias on the #3 grids.

The control electrodes or grids of the tubes 13 and 14 are coupled to the anodes $B_1$ and $B_2$ of the electronic switch tubes 11 and 12, respectively, through condensers 36 and 36', respectively. In order to leave the control electrodes of the tubes 13 and 14 at their more negative stable potential values to which the sharp negative anode voltage impulses have driven them, rectifying devices 37 and 38, respectively, may be interposed in the connections to the control electrodes of the tubes 13 and 14. The rectifying devices 37 and 38 may take the form of two-element electric discharge devices such as those known as diode vacuum tubes, for example. The respective anodes of the diodes 37 and 38 are connected to the grids or control electrodes of the tubes 13 and 14 whereas the cathodes are grounded through resistors 39 and 40, respectively.

In the operation of the circuit of Fig. 1 it is assumed that initially the discharge tubes 11 and 13 are conducting, and the tubes 12 and 14 are non-conducting. This condition may be assured by interposing a switch 41 in the cathode lead or the anode lead of the tube 14. Before operation of the circuit the switch 41 is opened momentarily to make sure that no current is flowing in the tube 14 and that its anode is at maximum potential. Since the anode of the tube 14 is coupled to the grid $D_1$ through the resistor 28, this operation insures the passage of current through the tube 13. The potential drop through the anode resistance 25 lowers the potential of the control electrode $D_2$ and the tube 14 is biased past cutoff to insure that the tube 14 will not be rendered conducting by closure of the switch 41. The potential of the control electrode $D_2$ cannot under this condition rise above ground potential owing to the fact that the diode 38 is so polarized as to prevent current drift in the necessary direction for raising the potential of the grid $D_2$.

Stability of two-equilibrium mode circuits such as represented by the tubes 13 and 14 may be obtained by causing the potential at a suitable point in the circuit of each tube to bias the control electrode of the other, either past negative cutoff or past positive cutoff. In either case, each tube will be shifted back and forth between conditions of relatively greater current conduction or conductivity and relatively less current conduction or conductivity. If the arrangement is such as to bias the control grids past negative cutoff the tube biased past negative cutoff will carry substantially zero current and the other will carry a value of current fixed by the grid potential. If the arrangement is such as to bias the control grids past positive cutoff, the tube biased past positive cutoff will be saturated and carry its saturation current while the other tube will carry a value of current less than its saturation current and fixed by its grid potential. I consider the arrangement using negative cutoff more stable and in much of the foregoing description and explanation and that to follow I refer to the specific conditions obtained by use of negative cutoff. However, it is to be understood that my invention is not limited to one specific arrangement and in the description and claims, wherever I use the terminology "shifting current," or biasing one tube "past cutoff" and maintaining the other "in current-conducting condition," I mean to embrace both of the equivalent arrangements in which relative conductivities and impedances of the tubes are shifted, whether by positive or negative cutoff and whether or not the current in the tube in less conductive condition is actually reduced to substantially zero.

If the input impulses at the input terminals 15 and 16 are of square shape as shown at $A_1$ in Fig. 3, the voltage wave at the #1 grids of the tubes 11 and 12 will be as represented by the curve $A_2$ of Fig. 3. Thus, the potential at the point $A_2$ rises and falls with abrupt changes in the curve $A_1$ but drifts to zero after each change along an exponential curve. The positive potential impulse on the #1 grid of tube 11 causes the tube to become conducting and produces a current impulse as shown in curve $I_1$ in Fig. 3. No current flows in the tube 12 because its auxiliary or #3 grid is held at a low potential by reason of the connection to the control electrode $D_2$ of the two equilibrium mode tube 14. The flow of anode current through the tube 11 produces an abrupt drop in anode potential as shown by the curve $B_1$ and consequently, an abrupt drop in the potential of the grid $D_1$ of the tube 13, as shown by the curve $D_1$ of Fig. 3. The control electrode of the tube 13 is thus biased beyond cut-off and, after a time delay sufficient for stability, the discharge current is shifted from the tube 13 to the tube 14 abruptly raising the anode potential of the tube 13 and thereby raising the control electrode potential of the tube 14 as represented by the curve $D_2$ of Fig. 3.

The auxiliary of #3 grid $F_1$ of the tube 11 was initially at maximum potential and the corresponding grid $F_2$ of tube 12 was originally at minimum potential but the shift in current between the tubes 13 and 14, or variation in the relative impedances of the tubes 13 and 14, reverses the relative potentials at the points $D_1$ and $D_2$ causing the potentials at the points $F_1$ and $F_2$ to drift gradually as shown in the curves $F_1$ and $F_2$ of Fig. 3, so that at the end of the first cycle of the curve $A_1$ of Fig. 3, the potential of the #3 grid of tube 11 has fallen to a minimum and that of the #3 grid of tube 12 has risen to a maximum. Consequently, the next impulse applied at the input terminals 15 and 16 will have no effect on the tube 11 but the tube 12 will be responsive thereto. In a manner similar to that explained before, the second positive input impulse will produce a shift in current from the tube 14 back to the tube 13 and the currents and voltages at the various points represented in Fig. 1 will follow the wave forms represented in Fig. 3. The potential at the output terminals 17 and 18 will be a square wave rising abruptly to a maximum when the first received impulse shifts current away from the tube 13 and falling abruptly to a minimum when the second positive impulse shifts current back to the tube 13, as shown by the curve H of Fig. 3. Thus, the relative impedances of the tubes 11 and 12 and the relative impedances of the tubes 13 and 14, are reversed upon the reception of each impulse.

In Fig. 1 I have shown an arrangement in which the circuit is driven by impulse voltages applied at the #1 grids of the tubes 11 and 12 through condenser coupling and passed through the tubes 11 and 12 to driving points for the tubes 13 and 14. My invention is not, however, limited to this precise arrangement. It does not exclude the application of driving impulses to other points in the circuits such as the driving points $F_1$ and $F_2$, $D_1$ and $D_2$, or alternatively the anodes of the tubes 13 and 14 by any other suitable coupling such as rectifier, resistor, capacitor, transformer or direct coupling or any of these types of coupling in combination, nor does my invention exclude the use of separate signal sources, such as photoelectric, magnetic, resistive, electrostatic, acoustic, or mechanical circuit making and breaking devices with amplifiers interposed if desired. In the drawings I have shown only the input terminals 15 and 16 and the aforesaid operative driving points of the circuit since the specific manner of producing the input impulses is not a part of my present invention. Furthermore, if desired the electronic switch tubes 11 and 12 may be arranged to drive the two equilibrium mode tubes 13 and 14 by acting directly on the anode voltages instead of coupling to the control electrodes of the tubes 13 and 14. The resistors 26, 28 and 30 may be considered as an impedance circuit associated with one of the tubes 13 and 14, and the resistors 25, 27 and 31 may be considered as a second impedance circuit associated with the other of the tubes. In Fig. 1, I have shown couplings between the anode circuits of the tubes 11 and 12 and two particular corresponding driving points for the tubes 13 and 14, viz., the control electrodes of the latter tubes. However, my invention is not limited to using these two particular corresponding driving points selected from points in said impedance circuits associated with the tubes 13 and 14 and points in the couplings between these impedance circuits and the auxiliary control grids $F_1$ and $F_2$.

As illustrated in Fig. 2, the tubes 11 and 12 may have their anodes connected directly to the anodes of the tubes 13 and 14 in order to commutate the latter tubes at their anodes. In this manner I may eliminate the diodes 37 and 38 in Fig. 1, together with the coupling condensers 36 and 36', and the four resistors 23, 24, 39 and 40. In this case, however, the relative positions of the triode units 13, 14 are reversed for simplification of the drawings. The assumed initial condition is that in the case of Fig. 2 also the triode 13 is carrying discharge current and the pentagrid 11 is in condition to be actuated by a positive impulse applied to its #1 grid. In the arrangement of Fig. 2 the ungrounded output terminal is connected to the anode of the tube 13 and is designated by the numeral 17'.

The voltage and current variations at various points in the circuit of Fig. 2 follow the same curve shapes as at corresponding points in the circuit of Fig. 1, as represented by the various curves of Fig. 3. When the tubes are in their initial condition and an initial input impulse is applied to the #1 grids of the tubes 11 and 12, the tube 11 only is affected since the #3 grid $F_1$ only is at a sufficiently high potential. The current impulse $I_1$ thereupon passes through the tube 11 and momentarily lowers the anode potentials of the tubes 11 and 14. Thus the grid potential of the tube 13 is lowered and the tubes 13 and 14 are commutated to shift current from the tube 13 to the tube 14. The relative potentials of the #3 grids of the tubes 11 and 12 are gradually shifted as shown in the curves $F_1$ and $F_2$ of Fig. 3. The next positive input impulse applied to the #1 grids of the tubes 11 and 12 is effective only to actuate the tube 12. Then the tubes 13 and 14 are again commutated to shift the current back from the tube 14 to the tube 13. Accordingly the output voltage H at the output terminals 17 and 18 follows a square wave of half the frequency of the input voltage $A_1$ as in the case of the circuit of Fig. 1.

If desired the circuits of Figs. 1 and 2 may be arranged to respond either to input impulses from a single source or to an input impulse from two different sources. For example, if one signal source $A_1$ is connected to the input terminals 15 and 16 and a second input signal source $Z_1$ is connected to a second pair of input terminals 42 and 42', a double throw single pole switch 43 may be provided having a movable contact 44 connected to the #1 grid of the tube 12 and having stationary contacts 45 and 46 connected to the ungrounded input terminals 15 and 42, respectively, of the two different input signal sources. Then by closure of the contacts 44 and 45 the circuit is made responsive only to input signals at the terminals 15 and 16 and the currents in the triode units 13 and 14 are shifted back and forth in response to successive input signals as already explained. On the other hand, if the contacts 44 and 46 of the double-throw switch 43 are closed, then input signals at the input terminals 15 and 16 are effective only to shift current from the triode unit 13 to the triode unit 14 and such a shift in current from the triode unit 13 to the triode unit 14 can be effected only by means of input signals applied at the terminals 15 and 16. Repeated impulses at the terminals 15 and 16 have no further effect with this setting of the switch 43. Likewise input signals applied to the input terminals 42 and 42' are associated exclusively with the shift of current from the tube 14 back to the tube 13.

Any suitable means may be provided for indicating which of the triode units 13 or 14 is in conducting condition, thus showing also whether the apparatus is in a desired initial condition for making a count or for controlling other apparatus. For example, suitable current or voltage responsive devices may be connected in or to the anode circuits of one or the other or both of these tubes. As illustrated in Fig. 2, voltage responsive devices in the form of lamps 47 and 48 are connected across the anode resistors 25 and 26, respectively. In consequence, when an even number of impulses has actuated the circuit the lamp 47 is illuminated, and when an odd number of impulses has actuated the circuit, the lamp 48 is illuminated. In place of lamps 47 and 48 I may also employ other electroresponsive devices such as relays or remote indicating apparatus, alarm devices, or the like.

If the apparatus is to be employed for causing an amplifier or other voltage-responsive apparatus to be effective or ineffective during the time interval between two successive impulses, or impulses received from two different sources, I may arrange such a device, represented by the rectangle 49, with an ungrounded input or control lead or conductor 50 either directly connected or otherwise coupled to the anode of the tube 13 or to the anode of the tube 14, according to whether the device 49 is to be made effective or ineffective during the time interval between the two received impulses. The length of a time interval may be measured by a suitable current quantity responsive device such as a ballistic ammeter or such as a condenser 51, shunted by a voltmeter 52, connected between the anode of one of the triodes and the ground. In place of a ballistic instrument for measurement of the time interval a device, such as a calorimeter heater, represented by the rectangle 53, may be connected across one of the triode units 13 or 14 so that it will be energized during the time interval between two received impulses.

I have herein shown and particularly described certain embodiments of my invention and certain methods of operation embraced therein for the purpose of explaining its practice and showing its application, but it will be obvious to those skilled in the art that many modifications and variations are possible and I aim therefore to cover all such modifications and variations as fall within the scope of my invention which are defined in the appended claims.

What I claim as new and desire to secure by Letters Patent of the United States is:

1. A counter circuit comprising a pair of electric discharge devices each having an anode, a cathode, a primary control electrode and an auxiliary control electrode, a second pair of discharge devices in push-pull connection having an anode, a cathode and a control electrode, with cross-coupling between the control electrodes and anodes of the latter pair of discharge devices, input terminals connected between the cathodes and primary control electrodes of the first pair of discharge devices, terminals to which an anode voltage source is adapted to be connected, one of said terminals being connected to the cathodes of the discharge devices, anode resistors connected between the respective anodes and the remaining anode voltage terminal, a pair of resistance condenser circuits each coupling an auxiliary control electrode of one of the first pair of discharge devices to the control electrode of one of the discharge devices of the second pair and couplings between anode circuits of the first and second pairs of discharge devices, whereby the first pair of electric discharge devices acts as an electronic switch with one of the auxiliary electrodes maintained at sufficiently high potential to render the discharge devices responsive to impulses applied to the primary control electrode and with the auxiliary control electrode of the other discharge device maintained at a potential below that rendering the discharge devices responsive to input signals at the primary control electrode, current is shifted in the second pair of discharge devices from one discharge device to the other in response to impulses transferred through the effective discharge device of the first pair and the relative potentials of the auxiliary control electrodes of the first pair of discharge devices are thereby reversed to render the other of the first pair of discharge devices responsive to the next input impulses at the primary control electrode.

2. In combination, a pair of electric discharge devices each having an anode, a cathode, a primary control electrode and an auxiliary control electrode, a second pair of electric discharge devices each having an anode, a cathode, and a control electrode, cross coupling between the anodes and control electrodes of the discharge devices of the second pair, input terminals connected between the cathodes and primary control electrodes of the first pair of discharge devices, resistance condenser coupling between the anodes of the first pair of discharge devices and the control electrodes of the second pair of discharge devices, and time delay connections between variable voltage points in the circuits of the second pair of discharge devices and the respective auxiliary control electrodes of the first pair of discharge devices, whereby one or the other of the second pair of discharge devices is in current-conducting condition to bias the other of the same pair of discharge devices past cutoff and the potentials of the auxiliary control electrodes of the first pair of discharge devices are maintained at values corresponding to those of the control electrodes of the second pair of discharge devices to maintain one or the other of the first pair of discharge devices in condition to be responsive to input impulses applied at its primary control electrode, in order that the first pair of electric discharge devices will act as a double-throw electronic switch with the circuit in condition to respond to impulses at the primary electrode of one or the other of the first pair of discharge devices according to whether an odd or an even number of impulses has actuated the apparatus.

3. In combination, a pair of electric discharge devices each having an anode, a cathode, a primary control electrode and an auxiliary control electrode, a second pair of electric discharge devices each having an anode, a cathode, and a control electrode, input terminals connected between the cathodes and the primary control electrodes of the first pair of discharge devices, terminals for the application of a current source for energizing the anode-cathode circuits of the electric discharge devices, one of said terminals being connected to the cathodes, an anode resistor connected between the remaining anode source terminal and the anodes of the one of each of said pairs of discharge devices, a second anode resistor connected between said anode source terminal and the anodes of the remaining two discharge devices, cross-coupling resistors between the anodes and control electrodes of the second pair of discharge devices, and coupling between said last-mentioned control electrodes and the auxiliary control electrodes of the first pair of discharge devices whereby one or the other of the second pair of discharge devices is in current-conducting condition and biases the other past cutoff, said discharge devices are commutated by negative voltage impulses produced by actuation of one or the other of the first pair of discharge devices and one or the other of said first pair of discharge devices is biased to condition to be actuated while the remaining discharge devices of the first pair of discharge devices is biased to ineffective condition by the coupling between the auxiliary control electrodes of the first pair of discharge devices and the control electrodes of the second pair of discharge devices.

4. In combination, a pair of electric discharge devices having anodes, cathodes and control electrodes, a second pair of electric discharge devices each having an anode, a cathode and a control electrode, a pair of impedance circuits each associated with one of the second pair of discharge devices, connections from electrodes of the second pair of discharge devices to points in said impedance circuits, said connections including cross couplings between the anodes and control electrodes to maintain one or the other of the discharge devices of the latter pair in relatively more conducting condition, while it biases the other of said pair to relatively less conducting condition, input terminals in circuit with control electrodes of the first pair, couplings between the anode circuits of the first pair of discharge devices and driving points of the respective discharge devices of the second pair for transferring conduction back and forth between the second pair of discharge devices in response to successive driving impulses, and couplings between points in the impedance circuits associated with the second pair of discharge devices and control electrodes of the first pair of discharge devices for rendering one or the other of the first pair of discharge devices in effective condition to be actuated according to which of the second pair of discharge devices is in relatively more conducting condition, whereby successive input impulses applied to the input terminals are passed through one or the other of the discharge devices of the first pair to one or the other of said driving points, said driving points comprising a pair of corresponding points selected from the said impedance circuits and the said couplings between points in the impedance circuits and the control electrodes of the first pair of discharge devices.

5. Apparatus of the character set forth in claim 4 in combination with apparatus to be rendered effective or ineffective during the time interval between two input impulses, said latter apparatus having a control voltage conductor coupled to one of the discharge device electrodes, the input terminals being adapted to be energized by input impulses.

6. In combination, a pair of electronic switch discharge devices having anodes, cathodes and control electrodes, a two equilibrium mode circuit having alternative current paths with a control for shifting current conduction back and forth between said current paths, coupling means between the discharge devices and the two equilibrium mode circuit for shifting conduction in the latter in response to actuation of one or the other of the discharge devices, coupling means between the current paths of the two equilibrium circuit and the respective control electrodes of the discharge devices for rendering one or the other of them responsive to input impulses whereby the application of successive impulses transfers conduction back and forth in the two equilibrium mode circuit to render only one or the other of the discharge devices responsive to the next applied impulse.

7. In combination, a pair of electronic switch discharge devices having anodes, cathodes and control electrodes, independent input terminals adapted to be connected to two different control signal sources, one of said input terminals being connected to a control electrode of one of said discharge devices and another of said input terminals being connected to a control electrode of the other of said discharge devices, a two equilibrium mode circuit having alternative current paths with a control for shifting conduction current back and forth between said current paths, coupling means between the discharge devices and the two equilibrium mode circuit for shifting conduction in the latter in response to actuation of one or the other of the discharge devices, coupling means between the current paths of the two equilibrium mode circuit and control electrodes of the respective discharge devices for rendering one or the other of them responsive to input impulses, whereby impulses transmitted through the discharge devices alternately transfer conduction back and forth in the two equilibrium mode circuit to render only one or the other of the discharge devices responsive to the next impulse applied to the input terminal associated therewith, thereby causing the apparatus to respond alternately to two different control signal sources regardless of the number of successive input signals supplied by one source before an input signal is supplied by the other source.

PHILIP C. MICHEL.